United States Patent
Ivosev

(10) Patent No.: US 10,732,156 B2
(45) Date of Patent: Aug. 4, 2020

(54) MULTI-TRACE QUANTITATION

(71) Applicant: DH Technologies Development Pte. Ltd., Singapore (SG)

(72) Inventor: Gordana Ivosev, Etobicoke (CA)

(73) Assignee: DH Technologies Development Pte. Ltd., Singapore (SG)

( * ) Notice: Subject to any disclaimer, the term of this patent is extended or adjusted under 35 U.S.C. 154(b) by 388 days.

(21) Appl. No.: 15/303,690

(22) PCT Filed: Apr. 14, 2015

(86) PCT No.: PCT/IB2015/000477
§ 371 (c)(1),
(2) Date: Oct. 12, 2016

(87) PCT Pub. No.: WO2015/166322
PCT Pub. Date: Nov. 5, 2015

(65) Prior Publication Data
US 2017/0038351 A1 Feb. 9, 2017

Related U.S. Application Data

(60) Provisional application No. 61/985,335, filed on Apr. 28, 2014.

(51) Int. Cl.
*G01N 30/86* (2006.01)
*G01N 30/96* (2006.01)
(Continued)

(52) U.S. Cl.
CPC ..... *G01N 30/8631* (2013.01); *G01N 30/8634* (2013.01); *G01N 30/96* (2013.01);
(Continued)

(58) Field of Classification Search
None
See application file for complete search history.

(56) References Cited

U.S. PATENT DOCUMENTS 4,353,242 A * 10/1982 Harris ............... G01N 30/8624
73/23.36
6,748,333 B1 * 6/2004 Ito ..................... G01N 30/8624
702/195
(Continued)

FOREIGN PATENT DOCUMENTS

JP 2012-159336 A 1/2011
JP 2013-519873 A 2/2011
(Continued)

OTHER PUBLICATIONS

Paul Sajda, Shuyan Du, Lucas C Parra, "Recovery of constituent spectra using non-negative matrix factorization," Proc. SPIE 5207, Wavelets: Applications in Signal and Image Processing X, (Nov. 13, 2003); doi:10.1117/12.504676 (Year: 2003).*
(Continued)

*Primary Examiner* — Lina M Cordero
(74) *Attorney, Agent, or Firm* — John R. Kasha; Kelly L. Kasha; Kasha Law LLC

(57) ABSTRACT

Systems and methods are provided for calculating the area of a peak profile using information from one or more correlated peak profiles. One or more compounds are separated from a mixture over time using a separation device. Traces of the one or more compounds are monitored during the separation using a tandem mass spectrometer. A plurality of intensity measurements are received using a processor. A first peak profile for a compound of interest is detected from the plurality of intensity measurements for a first trace and one or more correlated peak profiles for the compound of interest are detected from the plurality of intensity measurements for one or more other traces using the processor. An area of the first peak profile is calculated based on the one or more correlated peak profiles using the processor.

15 Claims, 12 Drawing Sheets

(51) Int. Cl.
  *H01J 49/00* (2006.01)
  *G01N 30/72* (2006.01)
(52) U.S. Cl.
  CPC ......... *G01N 30/72* (2013.01); *G01N 30/8637* (2013.01); *H01J 49/004* (2013.01)

(56) References Cited

U.S. PATENT DOCUMENTS

| | | | |
|---|---|---|---|
| 7,983,852 B2* | 7/2011 | Wright | G01N 30/8624 |
| | | | 702/32 |
| 2005/0114042 A1* | 5/2005 | Pappin | H01J 49/0036 |
| | | | 702/30 |
| 2005/0273276 A1 | 12/2005 | Szelewski et al. | |
| 2006/0255258 A1* | 11/2006 | Wang | G01N 30/8624 |
| | | | 250/282 |
| 2007/0203652 A1* | 8/2007 | Horning | H01J 49/0009 |
| | | | 702/19 |
| 2007/0284520 A1* | 12/2007 | Yamamoto | H01J 49/0009 |
| | | | 250/282 |
| 2008/0319676 A1 | 12/2008 | Ishihama | |
| 2012/0158318 A1* | 6/2012 | Wright | G01N 30/8675 |
| | | | 702/28 |
| 2012/0239306 A1* | 9/2012 | Dai | G06F 19/24 |
| | | | 702/22 |
| 2012/0241602 A1 | 9/2012 | Goshawk et al. | |
| 2012/0298852 A1 | 11/2012 | Kawaguchi et al. | |
| 2013/0153467 A1* | 6/2013 | Seki | B01J 21/063 |
| | | | 208/215 |
| 2013/0153761 A1 | 6/2013 | Bonner et al. | |
| 2013/0168546 A1 | 7/2013 | Denny et al. | |
| 2013/0206974 A1 | 8/2013 | Brown | |
| 2013/0240727 A1* | 9/2013 | Sumiyoshi | H01J 49/02 |
| | | | 250/288 |
| 2014/0339421 A1* | 11/2014 | Senko | H01J 49/0081 |
| | | | 250/283 |
| 2015/0146205 A1* | 5/2015 | Kulkarni | G01N 15/1434 |
| | | | 356/338 |
| 2015/0247829 A1* | 9/2015 | Sumiyoshi | G01N 30/8651 |
| | | | 250/288 |
| 2017/0067865 A1* | 3/2017 | Shimomura | G01N 30/7233 |

FOREIGN PATENT DOCUMENTS

| | | |
|---|---|---|
| JP | 2012-043721 A | 3/2012 |
| JP | 2012-242337 A | 12/2012 |

OTHER PUBLICATIONS

Gao et al. "Overlapping Spectra Resolution Using Non-Negative Matrix Facotization" Science Direct, Sep. 23, 2004.

International Search Report and Written Opinion for PCT/IB2015/000477, dated Jul. 16, 2015.

MacCoss, et al. A Correlation Algorithm for the Automated Quantitative Analysis of Shotgun Proteomics Data, Analytical Chemistry, 2003, vol. 75, No. 24, pp. 6912-6921.

Schulze et al. Quantitation in Mass-Spectrometry-Based Proteomics, Annual Review of Plant Biology, 2010, vol. 61, pp. 491-516.

* cited by examiner

MULTI-TRACE QUANTITATION

CROSS REFERENCE TO RELATED APPLICATION

This application claims the benefit of U.S. Provisional Patent Application Ser. No. 61/985,335, filed Apr. 28, 2014, the content of which is incorporated by reference herein in its entirety.

INTRODUCTION

An extracted ion chromatogram (XIC) is created by taking intensity values at a single, discrete mass value or a mass range, from a series of mass spectral scans. It indicates the behavior of a given mass or mass range as a function of time. XIC peak profile heights or peak profile areas can be used, for example, to quantify a compound of interest.

Often, however, when multiple fragments (or related XICs) are monitored, two or more fragments have practically identical XICs, referred to as correlated XIC peak profiles. Conventionally, users manually overlay such correlated XIC peak profiles to spot bad integrations. Essentially, users compare the area ratio of related peaks. However, some automatic peak detection and integration programs do not use this information. Each XIC is processed independently from one another, neglecting this important information.

SUMMARY

A system is disclosed for calculating the area of a peak profile using information from one or more correlated peak profiles. The system includes a separation device, a tandem mass spectrometer, and a processor. The separation device separates one or more compounds from a mixture over time. The tandem mass spectrometer monitors traces of the one or more compounds during the separation, producing a plurality of intensity measurements for the one or more compounds over time.

The processor receives the plurality of intensity measurements, and detects a first peak profile for a compound of interest from the plurality of intensity measurements for a first trace and detects one or more correlated peak profiles for the compound of interest from the plurality of intensity measurements for one or more other traces. The processor calculates an area of the first peak profile based on the one or more correlated peak profiles.

A method is disclosed for calculating the area of a peak profile using information from one or more correlated peak profiles. One or more compounds are separated from a mixture over time using a separation device. Traces of the one or more compounds are monitored during the separation using a tandem mass spectrometer, producing a plurality of intensity measurements for the one or more compounds over time. The plurality of intensity measurements are received using a processor. A first peak profile for a compound of interest is detected from the plurality of intensity measurements for a first trace using the processor. One or more correlated peak profiles for the compound of interest are detected from the plurality of intensity measurements for one or more other traces using the processor. An area of the first peak profile is calculated based on the one or more correlated peak profiles using the processor.

A computer program product is disclosed that includes a non-transitory and tangible computer-readable storage medium whose contents include a program with instructions being executed on a processor so as to perform a method for calculating the area of a peak profile using information from one or more correlated peak profiles. The method includes providing a system, wherein the system comprises one or more distinct software modules, and wherein the distinct software modules comprise a measurement module and an analysis module.

The measurement module receives a plurality of intensity measurements. One or more compounds are separated from a mixture over time using a separation device. Traces of the one or more compounds are monitored during the separation using a tandem mass spectrometer, producing the plurality of intensity measurements for the one or more compounds over time. The analysis module detects a first peak profile for a compound of interest from the plurality of intensity measurements for a first trace. The analysis module detects one or more correlated peak profiles for the compound of interest from the plurality of intensity measurements for one or more other traces. The analysis module calculates an area of the first peak profile based on the one or more correlated peak profiles.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
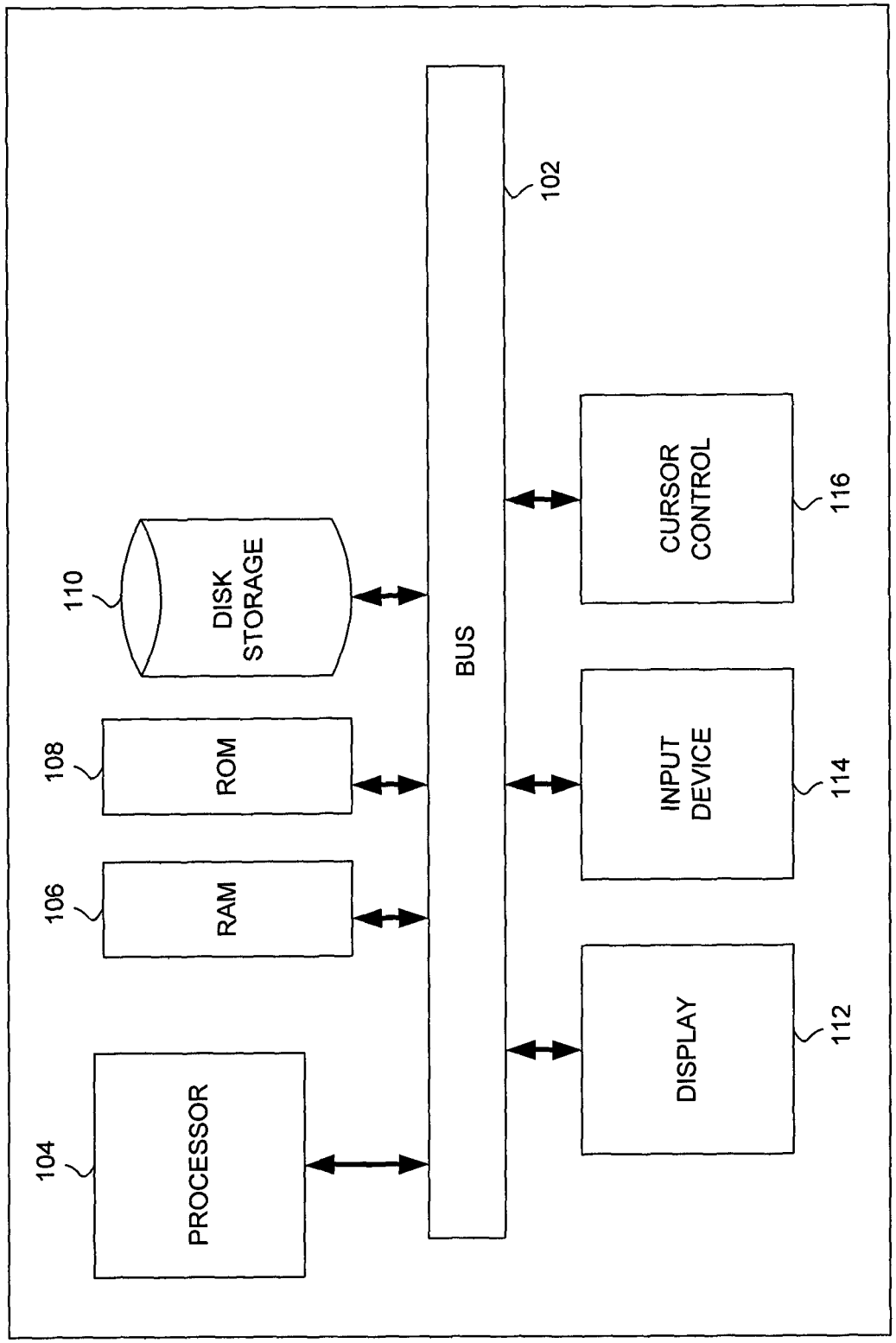
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Multi-Trace Quantitation

As described above, extracted ion chromatograms (XICs) are plots of the intensity of specific mass values as a function of time. XICs are used for quantitation. Often, however, two or more masses have practically identical XICs, called correlated XIC peak profiles. Conventionally, users manually overlay such correlated XIC peak profiles to spot bad integrations. Essentially, users compare the area ratio of related peaks. An XIC peak profile, for example, can be made from one or more LC peaks.

Figure 2:
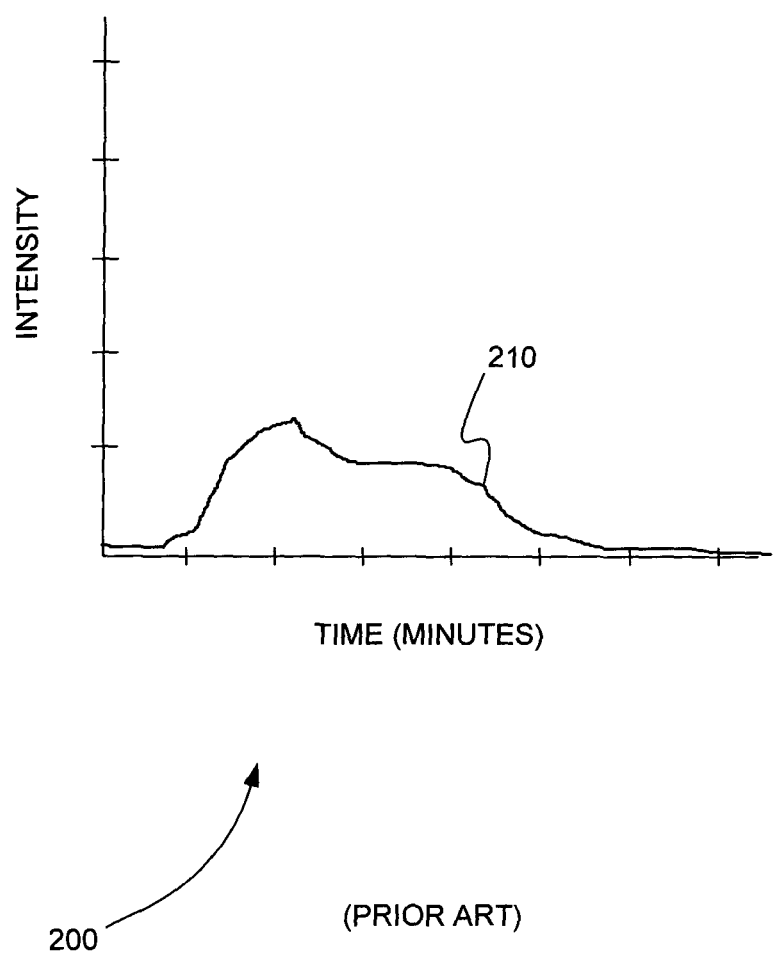
FIG. 2 is an exemplary plot of ion intensity values measured by a tandem mass spectrometer for one transition as a compound of interest is separated from a mixture over time.

FIG. 2 is an exemplary plot 200 of ion intensity values 210 measured by a tandem mass spectrometer for one transition as a compound of interest is separated from a mixture over time. Using a peak detection algorithm, for example, an initial position of at least one XIC peak profile can be determined from ion intensity values 210. Using this initial position and a peak model for the compound of interest, an initial shape of the XIC peak profile is determined. The shape can include the width and intensity, for example. From the XIC peak profile shape, the XIC peak profile area is determined by integrating over the peak shape.

Figure 3:
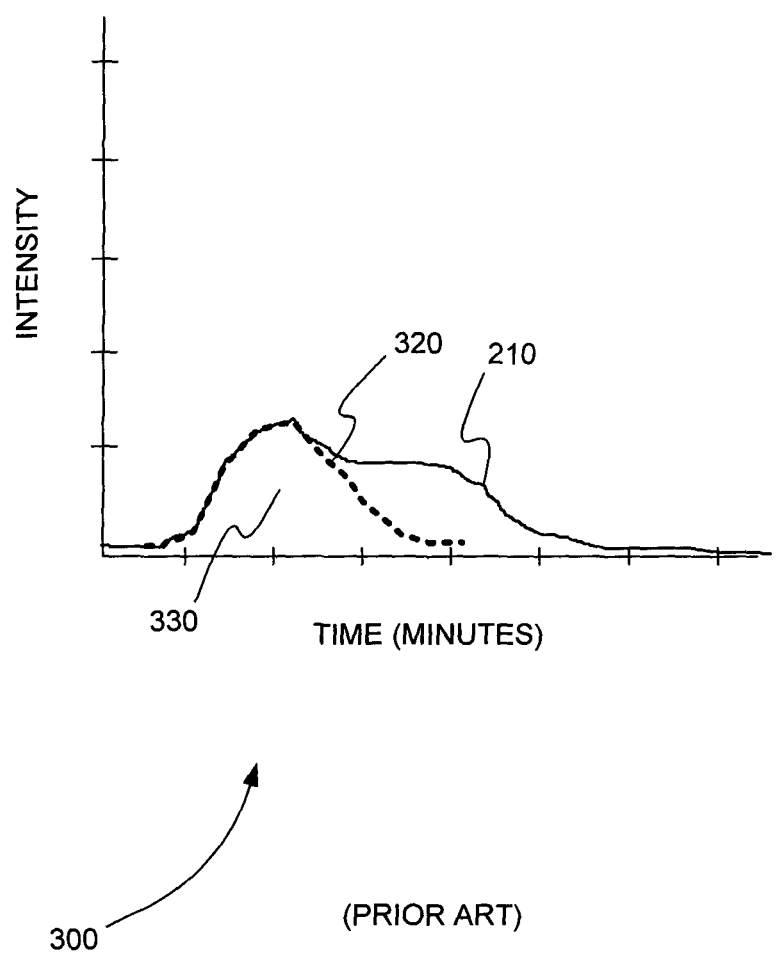
FIG. 3 is an exemplary plot showing the peak area of a first extracted ion chromatogram (XIC) peak profile determined from ion intensity values measured by a tandem mass spectrometer for one transition as a compound of interest is separated from a mixture over time.

FIG. 3 is an exemplary plot 300 showing peak area 330 of XIC peak profile 320 determined from ion intensity values 210 measured by a tandem mass spectrometer for one transition as a compound of interest is separated from a mixture over time. The position of XIC peak profile 320 is determined from ion intensity values 210. Using this position and a peak model for the compound of interest, the shape of XIC peak profile 320 is determined. Peak area 330 is determined by integrating over the shape of XIC peak profile 320. Peak area 330 is calculated independently of any other peaks. Conventionally, one or more correlated XIC peak profiles are overlaid on top of XIC peak profile 320 in order to manually adjust peak area 330 and the shape of XIC peak profile 320.

Figure 4:
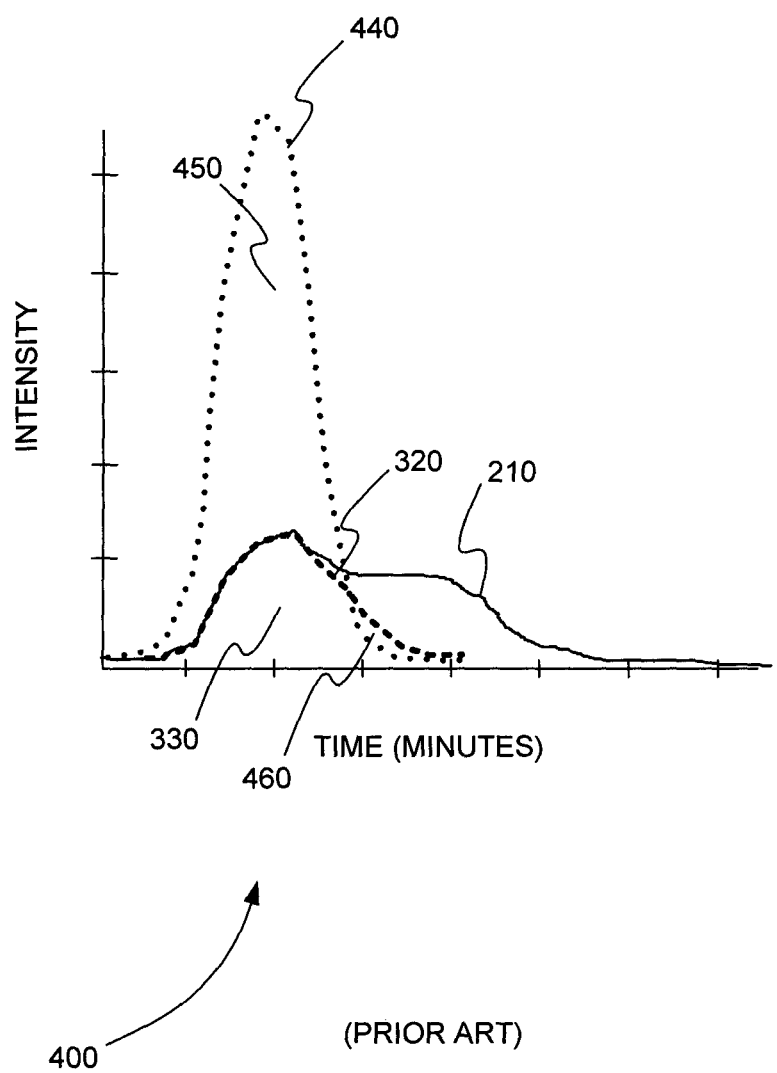
FIG. 4 is an exemplary plot showing a second XIC peak profile of another transition of a compound of interest overlaid a first XIC peak profile determined from ion intensity values measured by a tandem mass spectrometer for one transition as the compound of interest is separated from a mixture over time.

FIG. 4 is an exemplary plot 400 showing XIC peak profile 440 of another transition of a compound of interest overlaid on XIC peak profile 320 determined from ion intensity values 210 measured by a tandem mass spectrometer for one transition as the compound of interest is separated from a mixture over time. The position of XIC peak profile 440 is determined from a plurality of intensity values (not shown). Using this position and a peak model for the compound of interest, the shape of XIC peak profile 440 is determined. Peak area 450 is determined by integrating over the shape of XIC peak profile 440. Peak area 450 is calculated independently of any other peaks. XIC peak profile 440 is graphically placed in plot 400 so that its sampling times match those of plot 400, for example.

Manually comparing XIC peak profile 440 and XIC peak profile 320 shows that there is some error in the calculations of XIC peak profile 440 and/or XIC peak profile 320. For example, in area 460 XIC peak profile 320 has a higher intensity than XIC peak profile 440. This is not possible, because XIC peak profile 440 and XIC peak profile 320 come from the same compound of interest and XIC peak profile 440 is the more abundant ion. The more abundant ion cannot have a lower intensity at any point than the less abundant ion. Conventionally, the parameters of the XIC peak profile 440 and XIC peak profile 320 are adjusted until XIC peak profile 440 and XIC peak profile 320 have the correct physical meaning. Although current peak detection programs allow XIC peak profiles to be manually compared with correlated XIC peak profiles and manually corrected based on these correlated XIC peak profiles, these programs do not allow the area of an XIC peak profile to be calculated automatically based on one or more correlated XIC peak profiles.

In various embodiments, system and methods are provided to automatically calculate the area of an XIC peak profile based on one or more correlated XIC peak profiles. Essentially, the area of an XIC peak profile is integrated based on one or more correlated XIC peak profiles.

Figure 5:
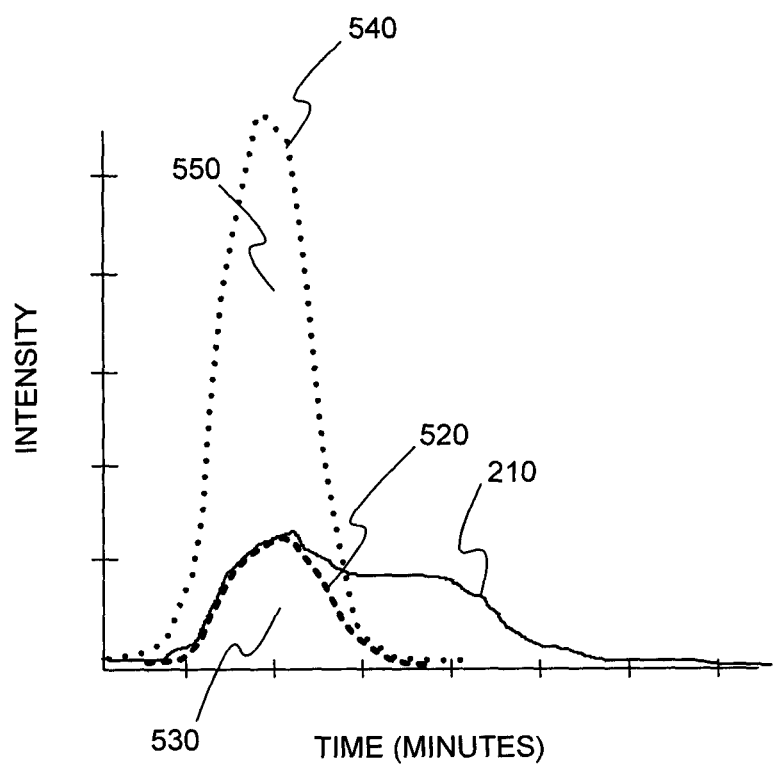
FIG. 5 is an exemplary plot showing a first XIC peak profile determined from ion intensity values measured by a tandem mass spectrometer for one transition as the compound of interest is separated from a mixture over time and integrated together with a second correlated XIC peak profile determined from another transition of the compound of interest, in accordance with various embodiments.

FIG. 5 is an exemplary plot 500 showing XIC peak profile 520 determined from ion intensity values 210 measured by a tandem mass spectrometer for one transition as the compound of interest is separated from a mixture over time and integrated together with correlated XIC peak profile 540 determined from another transition of the compound of interest, in accordance with various embodiments. In various embodiments, the initial position of XIC peak profile 520 is determined from ion intensity values 210 using a peak detection program. Similarly, the initial position of XIC peak profile 540 is determined from a plurality of ions intensity values (not shown).

An analytical model is used to find the initial shapes of XIC peak profile 520 and XIC peak profile 540. Parameters that define the shapes of XIC peak profile 520 and XIC peak profile 540 are then iteratively changed until the shape of XIC peak profile 520 is optimized in comparison to the shape of XIC peak profile 540. Peak area 530 of XIC peak profile 520 is integrated from the final optimized shape of XIC peak profile 520, and peak area 550 of XIC peak profile 540 is integrated from the final optimized shape of XIC peak profile 540. In this way, the areas of XIC peak profile 520 and XIC peak profile 540 are integrated together. Peak area 530 and 550 are then used for quantitation, for example. Although FIG. 5 shows only two correlated XIC peak profiles, one skilled in the art can appreciate that the areas of three or more correlated XIC can be integrated together in the same fashion.

The shape of XIC peak profile 520 can be optimized in comparison to the shape of XIC peak profile 540 in many different ways. In various embodiments, the begin and end times of correlated XIC peak profiles are constrained.

In various embodiments, the optimization criterion is a sum of errors for all correlated traces. For example, sum of errors, F, is calculated as shown below.

$$F = \frac{1}{2} \sum_{1}^{Ntransitions} \left( IntensityT_j - \sum_{1}^{P_j} y_p(position_{p,j}, width, intensity_{pj}) \right)^2$$

$y_P$ is equivalent to intensity. It is, for example, a fitted intensity with one value for each time point j.

Sum of errors, F, is minimized as shown below.

$$\frac{\partial F}{\partial ParameterVector} = 0$$

The parameter vector, ParameterVector, consists of positions, intensities, and widths for all peak candidates. In order to simplify the optimization problem, the width can be assumed to be the same for all peak candidates, for example. One peak candidate in each trace or transition, j, is common for all traces or transitions. This constraint controls the position of the common peak of interest and ensures that the common peak has the same LC profile across all transitions.

In various embodiments, the initial positions and shapes of XIC peak profile 520 and XIC peak profile 540 are determined using a blind deconvolution algorithm with a peak shape constraint. Given multiple mixtures of the same source compounds, where each mixture can contain different amounts of each of the source compounds, a blind deconvolution algorithm can extract underlying source compounds and the amounts that created those mixtures. The number of source compounds may not be known and the amount of each source compound in each corresponding mixture may not be known. Also, the shape of the XIC peak profile of the source compound is generally unknown but some constrains on the shape can be implied.

The blind deconvolution algorithm can include non-negative matrix factorization (NNMF), for example. NNMF guarantees a non-negative solution. A non-negative solution fits the non-negative nature of mass spectrometry data. Using NNMF, a number of iterations are performed with the number of source compounds or peak components changed from 1 to n. The solution that provides best fit (smallest sum of squared errors) is accepted, for example.

Figure 6:
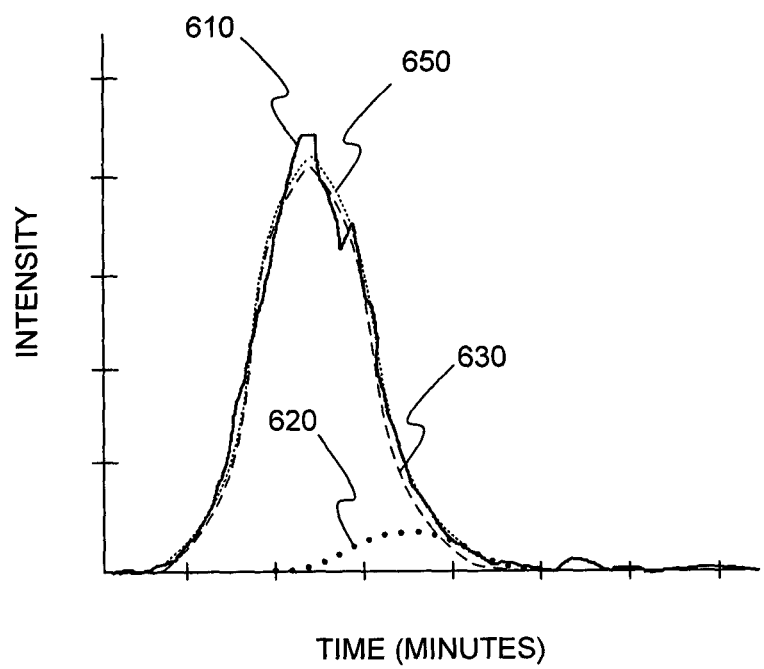
FIG. 6 is an exemplary plot showing a reconstruction of an XIC peak profile by two components for a first transition from a first mixture using non-negative matrix factorization (NNMF), in accordance with various embodiments.
Figure 6:
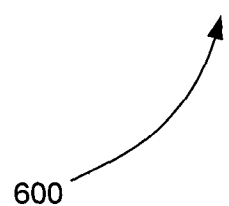

FIG. 6 is an exemplary plot 600 showing a reconstruction of an XIC peak profile 650 by two components for a first transition from a first mixture using NNMF, in accordance with various embodiments. Two XIC peak profile components 620 and 630 are found for intensity values 610 using NNMF. Together XIC peak profile components 620 and 630 form reconstructed XIC peak profile 650.

Figure 7:
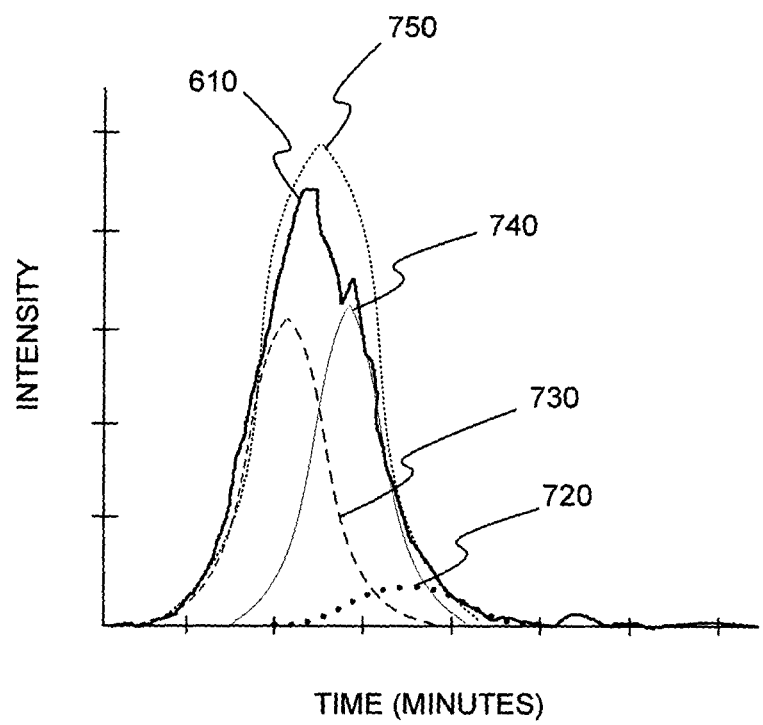
FIG. 7 is an exemplary plot showing a reconstruction of an XIC peak profile by three components for a first transition from a first mixture using NNMF, in accordance with various embodiments.
Figure 7:
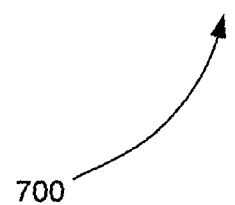

FIG. 7 is an exemplary plot 700 showing a reconstruction of an XIC peak profile 750 by three components for a first transition from a first mixture using NNMF, in accordance with various embodiments. Three XIC peak profile components 720, 730, and 740 are found for intensity values 610 using NNMF. Together XIC peak profile components 720, 730, and 740 form reconstructed XIC peak profile 750.

Figure 8:
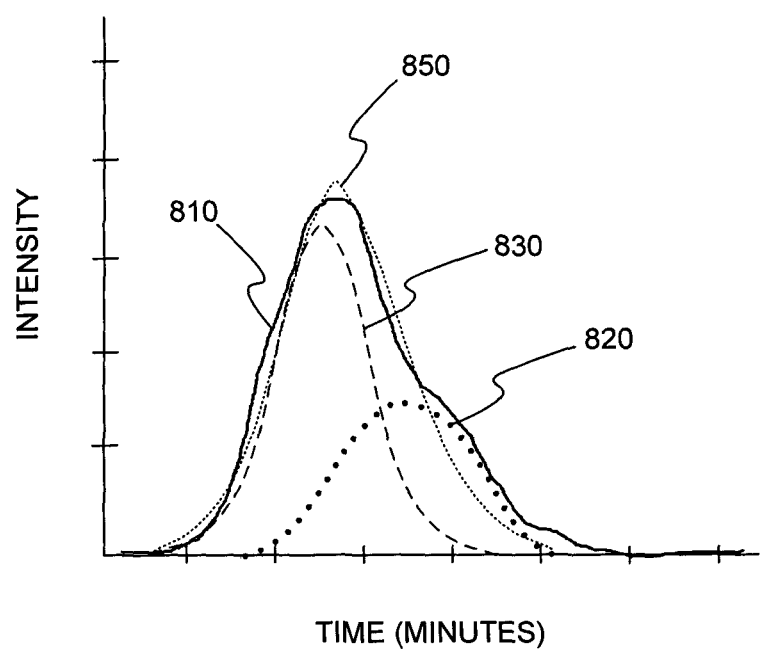
FIG. 8 is an exemplary plot showing a reconstruction of an XIC peak profile by two components for a second transition from a second mixture using NNMF, in accordance with various embodiments.

FIG. 8 is an exemplary plot 800 showing a reconstruction of an XIC peak profile 850 by two components for a second transition from a second mixture using NNMF, in accordance with various embodiments. Two XIC peak profile components 820 and 830 are found for intensity values 810 using NNMF. Together XIC peak profile components 820 and 830 form reconstructed XIC peak profile 850.

Figure 9:
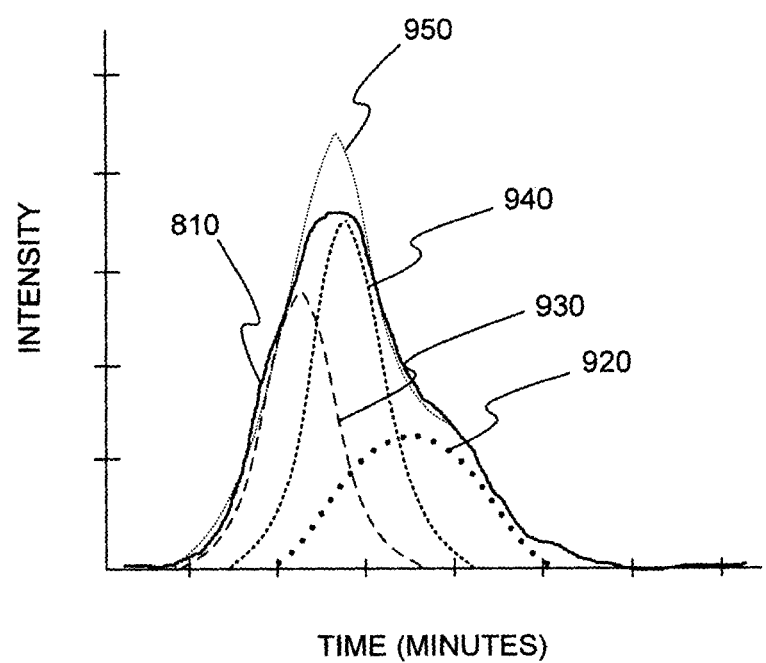
FIG. 9 is an exemplary plot showing a reconstruction of an XIC peak profile by three components for a second transition from a second mixture using NNMF, in accordance with various embodiments.

FIG. 9 is an exemplary plot 900 showing a reconstruction of an XIC peak profile 950 by three components for a second transition from a second mixture using NNMF, in accordance with various embodiments. Three XIC peak profile components 920, 930, and 940 are found for intensity values 810 using NNMF. Together XIC peak profile components 920, 930, and 940 form reconstructed XIC peak profile 950.

By comparing the XIC peak profile components in FIG. 6 with FIG. 8, the NNMF algorithm can determine, for example, that XIC peak profile component 820 of FIG. 8 is significant in the second mixture, but the similar XIC peak profile component 620 of FIG. 6 is not significant in the first mixture. This suggests that the second transition in the second mixture experiences interference from another source compound. Comparing the XIC peak profile components in FIG. 7 with FIG. 9 produces the same result.

By comparing the XIC peak profile components in FIG. 6 with FIG. 7, the NNMF algorithm can determine that ion intensity values 610 are more likely the result of a single source compound than the result of two different source compounds. First of all, because of the comparison of FIG. 6 with FIG. 8 it is known that XIC peak profile component 620 is not significant. Similarly, it can be shown that XIC peak profile component 720 is not significant by comparing FIG. 7 with FIG. 9.

Therefore, it only needs to be determined if the one XIC peak profile component 630 of FIG. 6 provides a better reconstruction of ion intensity values 610 or if the two XIC peak profile components 730 and 740 of FIG. 7 provide a better reconstruction of ion intensity values 610. In other words, the fit of reconstructed XIC peak profile 650 in FIG. 6 to ion intensity values 610 is compared to the fit of reconstructed XIC peak profile 750 in FIG. 7 to ion intensity values 610. This comparison shows that single XIC peak profile component 630 of FIG. 6 provides a better reconstruction of ion intensity values 610 than the two XIC peak profile components 730 and 740 of FIG. 7.

In various embodiments, the blind deconvolution algorithm can be constrained by the shape of correlated XIC peak profiles. For example, XIC peak profile component 630 of FIG. 6 can be calculated by the NNMF algorithm by based on one or more correlated components (not shown) of the first mixture.

Although FIGS. 2-9 describe XIC peak profiles and ion intensity measurements, various embodiments are not limited to specific types of peak profiles, or intensity measurements. In addition, FIGS. 2-9 describe transitions of one or more compounds. In various embodiments, transitions of one or more compounds are not limited to transitions that only produce one or more fragments, but can include any trace or time profile of the one or more compounds.

System for Calculating the Area of a Peak Profile

Figure 10:
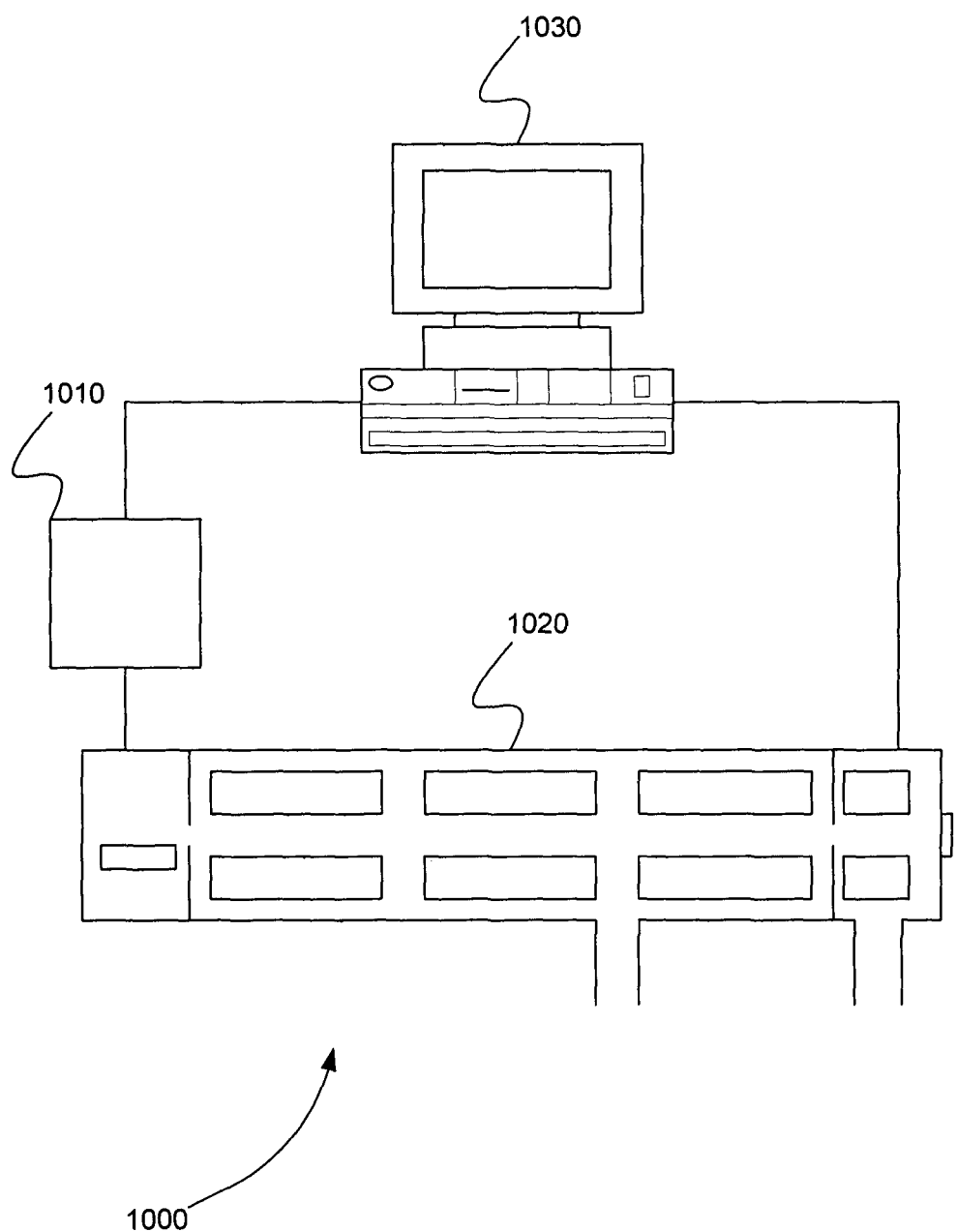
FIG. 10 is a schematic diagram showing a system for calculating the area of a peak profile using information from one or more correlated peak profiles, in accordance with various embodiments.

FIG. 10 is a schematic diagram showing a system 1000 for calculating the area of a peak profile using information from one or more correlated peak profiles, in accordance with various embodiments. System 1000 includes separation device 1010, tandem mass spectrometer 1020, and processor 1030. Separation device 1010 can perform a separation technique that includes, but is not limited to, liquid chromatography, gas chromatography, capillary electrophoresis, or ion mobility. Separation device 1010 separates one or more compounds from a mixture over time.

A mass analyzer of tandem mass spectrometer 1020 can include, but is not limited to, a time-of-flight (TOF), quadrupole, an ion trap, a linear ion trap, an orbitrap, or a Fourier transform mass analyzer. Tandem mass spectrometer 1020 monitors traces of the one or more compounds during the separation, producing a plurality of intensity measurements for the one or more compounds over time.

Processor 1030 can be, but is not limited to, a computer, microprocessor, or any device capable of sending and receiving control signals and data from tandem mass spectrometer 1020 and processing data. Processor 1030 can be, for example, computer system 100 of FIG. 1. In various embodiments, processor 1030 is in communication with tandem mass spectrometer 1020 and separation device 1010.

Processor 1030 receives the plurality of intensity measurements. Processor 1030 detects a first peak profile for a compound of interest from the plurality of intensity measurements for a first trace. Processor 1030 detects one or more correlated peak profiles for the compound of interest from the plurality of intensity measurements for one or more other traces. Processor 1030 calculates an area of the first peak profile based on the one or more correlated peak profiles.

In various embodiments, trace comprises a fragmentation of a precursor ion to a product ion. Alternatively, in various embodiments, a trace comprises a separation of a label from an internal standard of the compound of interest.

In various embodiments, processor 1030 detects a first peak profile and detects one or more correlated peak profiles by selecting an initial position for the first peak profile and selecting an initial position for each of the one or more correlated peak profiles.

In various embodiments, processor 1030 calculates an area of the first peak profile based on the one or more correlated peak profiles by performing the following steps. Processor 1030 selects an initial width and an initial intensity for the first peak profile based on a peak model for the compound of interest. Processor 1030 selects an initial width and an initial intensity for each of the one or more correlated peak profiles based on the peak model. Processor 1030 iteratively changes values for position, width, and intensity for the first peak profile and each of the one or more correlated peak profiles until a mathematical optimization criterion is met. Finally, processor 1030 calculates the area of the first peak profile from the last position, width, and intensity of the first peak profile using the peak model.

In various embodiments, the mathematical optimization criterion comprises constraining the positions of the first peak profile and each of the one or more correlated peak profiles so that no more abundant peak has a lower intensity than any less abundant peak.

In various embodiments, processor 1030 detects a first peak profile and detects one or more correlated peak profiles by performing a blind deconvolution method. The blind deconvolution method includes, for example, non negative matrix factorization (NNMF).

In various embodiments, processor 1030 calculates an area of the first peak profile based on the one or more correlated peak profiles by constraining the deconvolution method based a shape of the compound of interest.

Method for Calculating the Area of a Peak Profile

Figure 11:
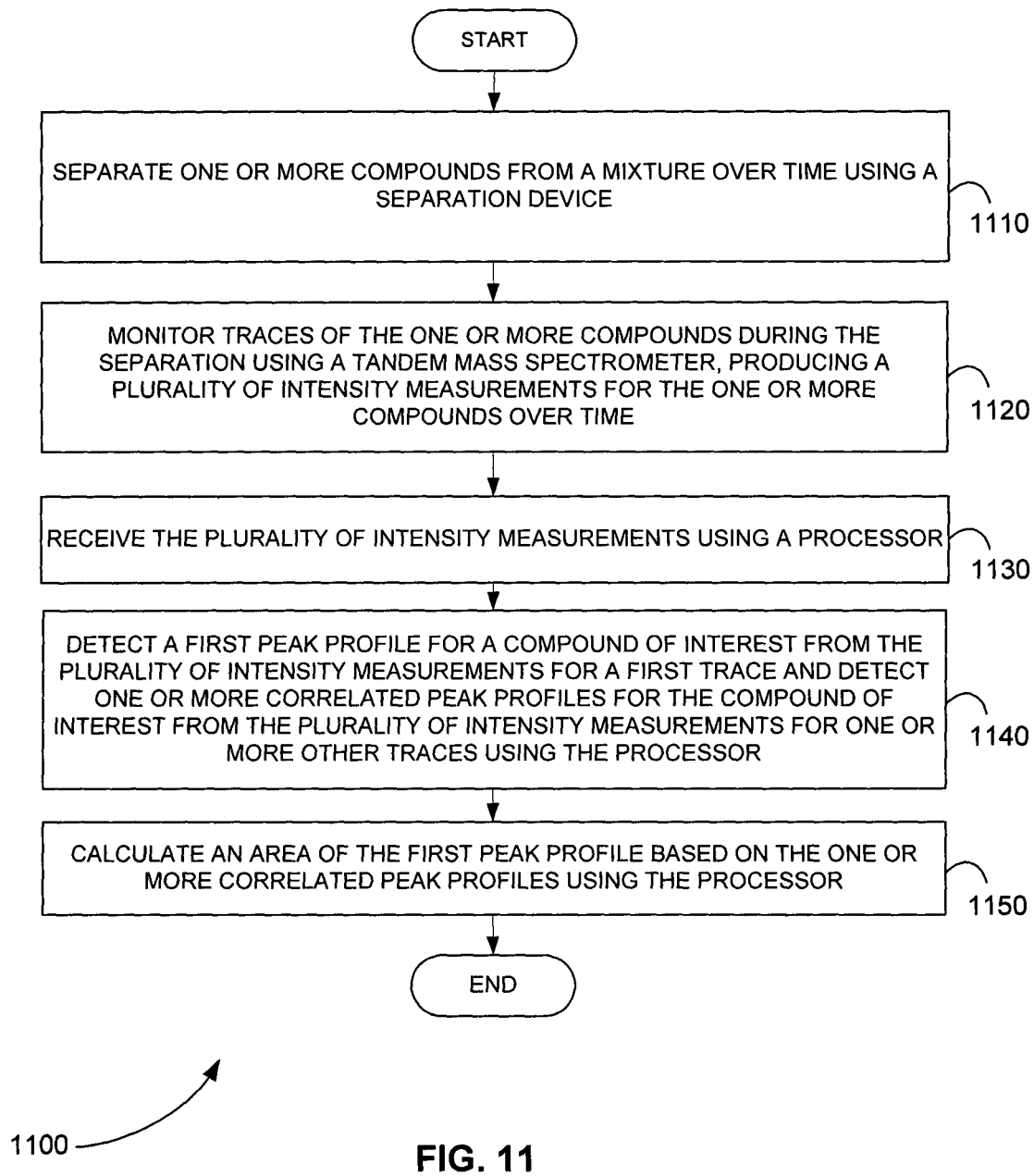
FIG. 11 is a flowchart showing a method for calculating the area of a peak profile using information from one or more correlated peak profiles, in accordance with various embodiments.

FIG. 11 is a flowchart showing a method 1100 for calculating the area of a peak profile using information from one or more correlated peak profiles, in accordance with various embodiments.

In step 1110 of method 1100, one or more compounds are separated from a mixture over time using a separation device.

In step 1120, traces of the one or more compounds are monitored during the separation using a tandem mass spectrometer, producing a plurality of intensity measurements for the one or more compounds over time.

In step 1130, the plurality of intensity measurements are received using a processor.

In step 1140, a first peak profile for a compound of interest is detected from the plurality of intensity measurements for a first trace and one or more correlated peak profiles for the compound of interest are detected from the plurality of intensity measurements for one or more other traces using the processor.

In step 1150, an area of the first peak profile is calculated based on the one or more correlated peak profiles using the processor.

Computer Program Product for Calculating the Area of a Peak Profile

In various embodiments, computer program products include a tangible computer-readable storage medium whose contents include a program with instructions being executed on a processor so as to perform a method for calculating the area of a peak profile using information from one or more correlated peak profiles. This method is performed by a system that includes one or more distinct software modules.

Figure 12:
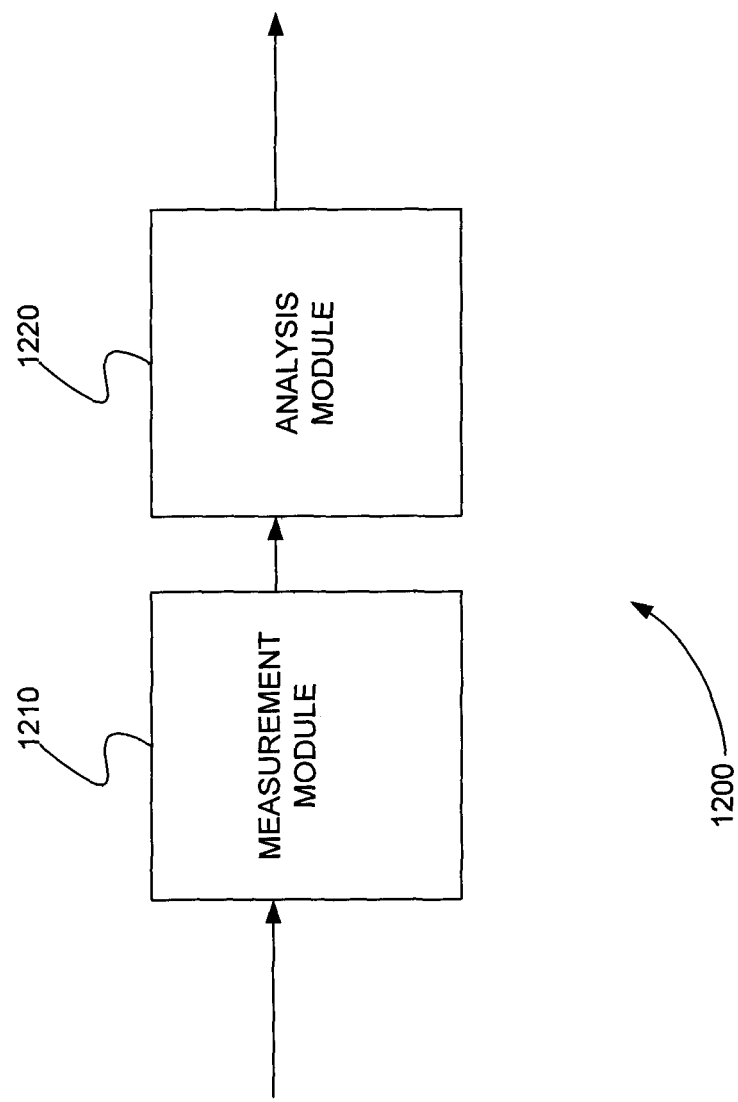
FIG. 12 is a schematic diagram of a system that includes one or more distinct software modules that performs a method for calculating the area of a peak profile using information from one or more correlated peak profiles, in accordance with various embodiments.

FIG. 12 is a schematic diagram of a system 1200 that includes one or more distinct software modules that performs a method for calculating the area of a peak profile using information from one or more correlated peak profiles, in accordance with various embodiments. System 1200 includes measurement module 1210 and analysis module 1220.

Measurement module 1210 receives a plurality of intensity measurements. One or more compounds are separated from a mixture over time using a separation device. Traces of the one or more compounds are monitored during the separation using a tandem mass spectrometer, producing the plurality of intensity measurements for the one or more compounds over time.

Analysis module 1220 detects a first peak profile for a compound of interest from the plurality of intensity measurements for a first trace. Analysis module 1220 detects one or more correlated peak profiles for the compound of interest from the plurality of intensity measurements for one or more other traces. Analysis module 1220 calculates an area of the first peak profile based on the one or more correlated peak profiles.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for calculating an area of a first extracted ion chromatogram (XIC) peak profile for a first product ion of a compound of interest using information from one or more correlated XIC peak profiles for one or more other product ions of the compound of interest, comprising:
 a separation device that separates one or more compounds from a mixture over time;
 a tandem mass spectrometer that monitors fragmentations of precursor ions of the one or more compounds to product ions during the separation, producing a plurality of intensity measurements for the product ions of the one or more compounds over time; and
 a processor that
  receives the plurality of intensity measurements;
  detects the first XIC peak profile for the first product ion of the compound of interest from the plurality of intensity measurements for a first fragmentation of a precursor ion of the compound of interest to the first product ion and detects the one or more correlated XIC peak profiles for the one or more other product ions of the compound of interest from the plurality of intensity measurements for one or more other fragmentations of the precursor ion of the compound of interest to the one or more other product ions, and
  calculates the area of the first XIC peak profile based on the one or more correlated XIC peak profiles by iteratively changing parameters for shapes of the first XIC peak profile and each of the one or more correlated XIC peak profiles until a mathematical optimization criterion is met.

2. The system of claim 1, wherein the processor detects the first XIC peak profile and detects the one or more correlated XIC peak profiles by selecting an initial position for the first XIC peak profile and selecting an initial position for each of the one or more correlated XIC peak profiles.

3. The system of claim 1, wherein the processor calculates the area of the first XIC peak profile based on the one or more correlated XIC peak profiles by:
selecting an initial width and an initial intensity for the first XIC peak profile based on a peak model for the compound of interest,
selecting an initial width and an initial intensity for each of the one or more correlated XIC peak profiles based on the peak model,
iteratively changing values for position, width, and intensity for the first XIC peak profile and each of the one or more correlated XIC peak profiles until the mathematical optimization criterion is met, and
calculating the area of the first XIC peak profile from last values of position, width, and intensity of the first XIC peak profile using the peak model.

4. The system of claim 3, wherein the mathematical optimization criterion comprises constraining the positions of the first XIC peak profile and each of the one or more correlated XIC peak profiles so that no more abundant peak has a lower intensity than any less abundant peak.

5. The system of claim 1, wherein the processor detects the first XIC peak profile and detects the one or more correlated XIC peak profiles by
performing a blind deconvolution method.

6. The system of claim 5, wherein the processor calculates the area of the first XIC peak profile based on the one or more correlated XIC peak profiles by
constraining the blind deconvolution method based on a shape of the first XIC peak profile of the compound of interest.

7. The system of claim 5, wherein the blind deconvolution method comprises non negative matrix factorization (NNMF).

8. A method for calculating an area of a first extracted ion chromatogram (XIC) peak profile for a first product ion of a compound of interest using information from one or more correlated XIC peak profiles for one or more other product ions of the compound of interest, comprising:
separating one or more compounds from a mixture over time using a separation device;
monitoring fragmentations of precursor ions of the one or more compounds to product ions during the separation using a tandem mass spectrometer, producing a plurality of intensity measurements for the product ions of the one or more compounds over time;
receiving the plurality of intensity measurements using a processor;
detecting the first XIC peak profile for the first product ion of the compound of interest from the plurality of intensity measurements for a first fragmentation of a precursor ion of the compound of interest to the first product ion and detecting the one or more correlated XIC peak profiles for the one or more other product ions of the compound of interest from the plurality of intensity measurements for one or more other fragmentations of the precursor ion of the compound of interest to the one or more other product ions using the processor, and
calculating the area of the first XIC peak profile based on the one or more correlated XIC peak profiles using the processor by iteratively changing parameters for shapes of the first XIC peak profile and each of the one or more correlated XIC peak profiles until a mathematical optimization criterion is met.

9. The method of claim 8, wherein detecting the first XIC peak profile and detecting the one or more correlated XIC peak profiles comprises
selecting an initial position for the first XIC peak profile and selecting an initial position for each of the one or more correlated XIC peak profiles.

10. The method of claim 8, wherein calculating the area of the first XIC peak profile based on the one or more correlated XIC peak profiles comprises:
selecting an initial width and an initial intensity for the first XIC peak profile based on a peak model for the compound of interest,
selecting an initial width and an initial intensity for each of the one or more correlated XIC peak profiles based on the peak model,
iteratively changing values for position, width, and intensity for the first XIC peak profile and each of the one or more correlated XIC peak profiles until the mathematical optimization criterion is met, and
calculating the area of the first XIC peak profile from last values of position, width, and intensity of the first XIC peak profile using the peak model.

11. The method of claim 8, wherein detecting the first XIC peak profile and detecting the one or more correlated XIC peak profiles comprises
performing a blind deconvolution method.

12. The method of claim 11, wherein calculating the area of the first XIC peak profile based on the one or more correlated XIC peak profiles comprises
constraining the blind deconvolution method based on a shape of the first XIC peak profile of the compound of interest.

13. The method of claim 11, wherein the blind deconvolution method comprises non negative matrix factorization (NNMF).

14. The method of claim 8, wherein the mathematical optimization criterion comprises constraining positions of the first XIC peak profile and each of the one or more correlated XIC peak profiles so that no more abundant peak has a lower intensity than any less abundant peak.

15. A computer program product, comprising a non-transitory and tangible computer-readable storage medium whose contents include a program with instructions being executed on a processor so as to perform a method for calculating an area of a first extracted ion chromatogram (XIC) peak profile for a first product ion of a compound of interest using information from one or more correlated XIC peak profiles for one or more other product ions of the compound of interest, comprising:
providing a system, wherein the system comprises one or more distinct software modules, and wherein the one or more distinct software modules comprise a measurement module and an analysis module;
receiving a plurality of intensity measurements using the measurement module, wherein one or more compounds are separated from a mixture over time using a separation device, and wherein fragmentations of precursor ions of the one or more compounds to product ions are monitored during the separation using a tandem mass spectrometer, producing the plurality of intensity measurements for the product ions of the one or more compounds over time;
detecting the first XIC peak profile for the first product ion of the compound of interest from the plurality of intensity measurements for a first fragmentation of a precursor ion of the compound of interest to the first product ion and detecting the one or more correlated XIC peak profiles for the one or more other product ions of the compound of interest from the plurality of intensity measurements for one or more other fragmentations of the precursor ion of the compound of interest to the one or more other product ions using the analysis module, and calculating the area of the first XIC peak profile based on the one or more correlated XIC peak profiles using the analysis module by iteratively changing parameters for shapes of the first XIC peak profile and each of the one or more correlated XIC peak profiles until a mathematical optimization criterion is met.

* * * * *